United States Patent Office 3,124,262
Patented Mar. 10, 1964

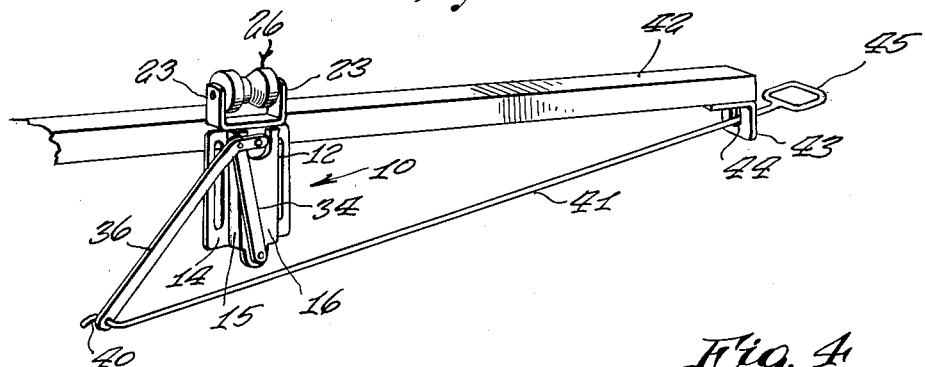
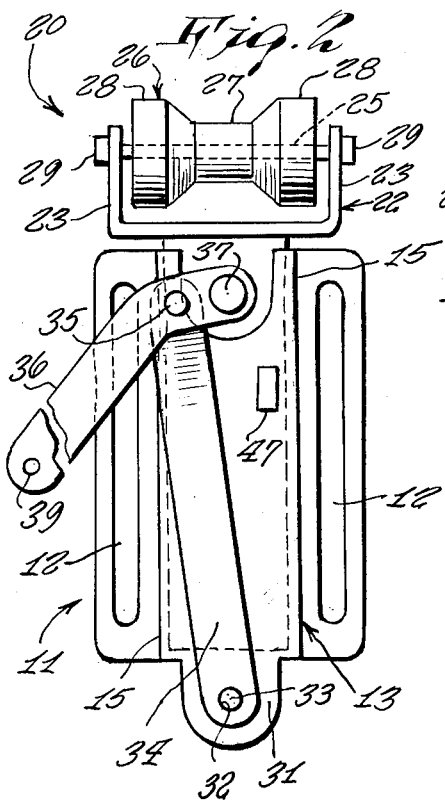
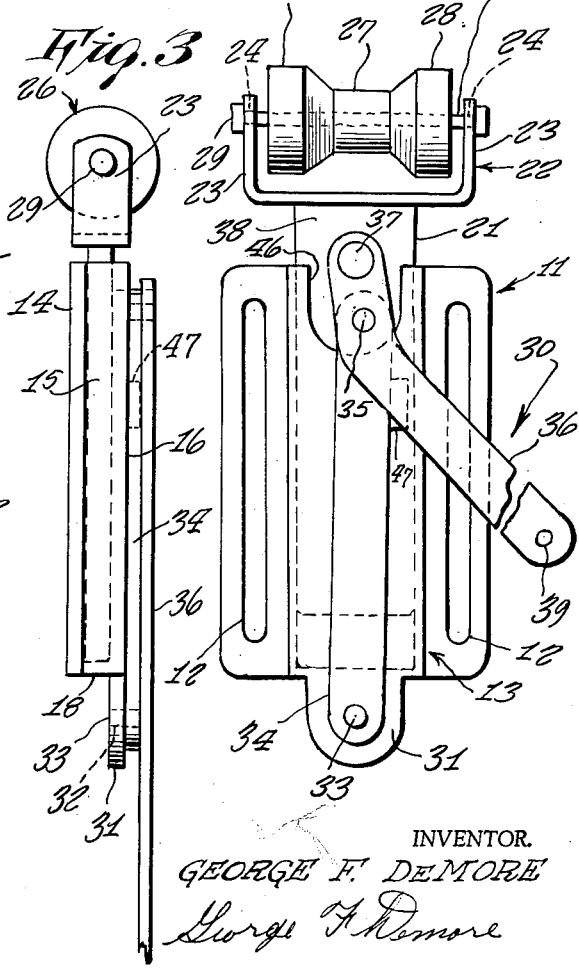

3,124,262
EASY LAUNCH KEEL ROLLER BRACKET
George F. Demore, Rte. 4, Box 553, Springfield, Mo.
Filed Aug. 14, 1961, Ser. No. 131,344
2 Claims. (Cl. 214—512)

This invention relates generally to trailers for carrying small boats and more specifically to a keel roller bracket device to be used in conjunction therewith.

It is an object of the invention to provide a keel roller bracket device which will make it easier to unload a boat from the boat trailer.

It is another object of the invention to provide a keel roller bracket device that is designed to have a vertical in-line lifting action resulting in practically no friction during operation.

It is still another object of the invention to provide a keel roller bracket device for boat trailers which will completely replace the conventional bracket devices currently in use without altering trailer design in any way.

It is still another object of the invention to provide a keel roller bracket device for boat trailers having stop means whereby the device may be retained in raised position while the boat is being removed from the trailer.

It is another object of the invention to provide a keel roller bracket device which will not interfere with the trailer undercarriage.

Still a further object of the invention is to provide a keel roller bracket device which will make the launching of larger boats, especially those with larger motors, an almost effortless task, thus saving much time in the launching of a boat, particularly at crowded boat basins, and enabling the boat basin to launch boats in rapid succession.

Other objects of the invention are to provide a keel roller bracket device bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawings, in which:

FIGURE 1 is a perspective view of the invention shown attached to a boat trailer frame;

FIG. 2 is a front elevational view of the invention shown in downward, retracted position;

FIG. 3 is an end elevational view thereof;

FIG. 4 is a view simialr to FIG. 2 showing the device in upwardly extended position.

Referring now to the drawing in detail, the numeral 10 represents a keel roller bracket device made according to the present invention wherein there is a base member 11 having a plurality of slotted openings 12 through which screws or bolts may be passed to attach the device in an adjustable vertical or upstanding position as shown in FIG. 1 to a boat trailer frame. Integrally formed with the base member 11 is a socket element or guide 13 formed by means of the back wall 14 of the base, vertical side walls 15 and vertical front wall 16. Thus, a chamber 17 is formed therewithin, which is open at the top and which is closed at the bottom by means of a bottom wall 18. A vertically movable roller member or boat lifter 20 is provided with a downward extension or shank 21 of rectangular cross section which is made to slidably fit into the socket chamber. Integrally affixed at the top of the shank 21 is a yoke 22, the parallel upstanding arms 23 of which form standards and may be provided with bearings 24. A shaft or support 25 extends between the bearings and a roller 26 is rotatably mounted upon the shaft 25. It will be understood that the shaft or support 25 may be fixed relative to yoke 22 if the roller 26 is rotatably mounted on the shaft, or the roller 26 may be fixed to shaft 25 if the ends of the shaft are rotatably mounted in arms 23. The roller 26 has a central portion 27 of relatively lesser diameter and other portions 28 at each end of relatively larger diameter. The shaft 25 may be provided with enlarged heads 29 at each end to prevent disengagement of the shaft 25 with the yoke 22. An extensible linkage assembly 30 is provided for operating the device.

An extension 31 of the front wall 16 is provided with a bearing 32 through which a pin or pivotal connection 33 extends forwardly and attached to the pin 33 is the lower end of a link member or arm 34. The link arm 34 has a pin 35 affixed thereto at its upper end. A lever or link member 36 forms part of the linkage assembly, the lever 36 being pivotally connected to link arm 34 by a mounted pin 35 located at a point between the two extreme ends of the lever.

One end of the lever 36 is pivotally connected by a pin or pivotal connection 37 to the front face 38 of the shank 21. The other end of the lever 36 has an opening 29 which is engaged by a hook portion 40 of an actuating member or rod 41, as shown in FIG. 1. The boat trailer frame 42 to which the keel roller bracket device is attached in a vertical position has an angle bracket 43 also attached thereto. The angle bracket 43 has a slotted opening 44 through which the rod 41 extends. A convenient handle 45 is formed at the end of the rod 41 for purpose of operating the keel roller bracket device.

It is to be noted that a cutaway, or open groove, is provided in the upper end of the front wall 16 of the socket element 13, as indicated at 46. This is for the purpose of making clearance for the connection between the linkage assembly and the shank of the roller member.

It is to be understood that the device may be made of steel or other strong metal and the base member may be cast, forged or otherwise formed.

In operation, the device operates as follows: In normal transit the boat rests upon the trailer by means of support blocks. When it is desired to remove the boat from the trailer, the operator pulls handle 45 which causes the lever 36 to rotate about the fulcrum pin 35, thereby causing the shank 21 to be lifted upwardly and engaging the roller 26 with the bottom of the boat keel and raising the same off the support blocks. It will be noted that as the lever 36 rotates about the fulcrum pin 35, the fulcrum pin 35 moves transversely relative to the generally vertical movement of the roller member 22.

In its fully pivoted position the top end of the lever 36 overrides the center on which it is pivoted to pin 35, thus causing the vertically movable roller member to be retained in an upward position. It should be mentioned that the socket element is provided with a stop 47 attached to the front wall 16 thereof. The purpose of this stop is to limit the distance of travel of the link 34 and thereby limit the amount of override described above.

The boat, now lifted off the support blocks and resting on the keel area, may be quickly and efficiently rolled off the boat trailer.

While various changes may be made in the detail construction, it shall be understood that such changes shall be within the spirit and scope of the present invention as defined by the appended claims.

What I claim as new and desire to protect by Letters Patent of the United States is:

1. In a boat trailer having a boat-lifting device, the improvement wherein the boat-lifting device comprises a base member secured to the trailer and having a generally vertical guide, a boat lifter having a downward extension slidably mounted in said guide to permit generally vertical movement of said boat lifter between a lowered position and a raised position, an expansible linkage for moving said boat lifter between said positions, said linkage comprising a lever, a first pivotal connection between one end of said lever and said boat lifter, a link, a second pivotal connection between the lower end of said link and said base member at the lower end of the base member, a fulcrum pin pivotally connecting the upper end of said link to said lever at a point between the ends of said lever, the total distance between said first pivotal connection and said fulcrum pin and between said fulcrum pin and said second pivotal connection being greater than the distance from the first pivotal connection to the second pivotal connection when said boat lifter is in its lowered position, said lever extending generally downwardly and toward one side of the trailer, a rod engaging the lower end of said lever and extending generally laterally to the other side of the trailer, a handle on said rod, and a stop for limiting the movement of the lower end of the lever and the upper end of said link toward said other side, said handle, when grasped and pulled generally laterally of the trailer, swinging the lower end of said lever and the upper end of said link toward said other side of the trailer to raise the boat lifter, the distance between said first and second pivotal connections being substantially equal to the total distance between the first pivotal connection and the fulcrum pin and between the fulcrum pin and the second pivotal connection when the boat lifter is in its raised position, the linkage engaging said stop when the fulcrum pin is closer to said other side of the trailer than said first and second pivotal connections, whereby said boat lifter is maintained in a raised position.

2. In a boat trailer having a device as set forth in claim 1 further comprising means for adjusting said base member in a generally vertical direction.

References Cited in the file of this patent

UNITED STATES PATENTS

| | | |
|---|---|---|
| 1,257,509 | Marr | Feb. 26, 1918 |
| 2,733,823 | Evans | Feb. 7, 1956 |
| 2,793,693 | Menk | May 28, 1957 |
| 2,805,786 | Green | Sept. 10, 1957 |
| 2,816,672 | Facchini | Dec. 17, 1957 |
| 2,840,252 | Weber | June 24, 1958 |